United States Patent
Ratliff et al.

(10) Patent No.: US 9,829,277 B2
(45) Date of Patent: Nov. 28, 2017

(54) ILLUMINATION SYSTEM FOR WEAPON OPTICS

(71) Applicant: ZEROlight LLC, Shiner, TX (US)

(72) Inventors: Derrick Ratliff, College Station, TX (US); Hazer Bulkley, Gillette, WY (US); Fred Hunt, Athol, ID (US)

(73) Assignee: ZEROlight LLC, Shiner, TX (US)

( * ) Notice: Subject to any disclaimer, the term of this patent is extended or adjusted under 35 U.S.C. 154(b) by 0 days.

(21) Appl. No.: 14/810,203

(22) Filed: Jul. 27, 2015

(65) Prior Publication Data
US 2016/0025453 A1  Jan. 28, 2016

Related U.S. Application Data

(60) Provisional application No. 62/029,565, filed on Jul. 28, 2014.

(51) Int. Cl.
| | |
|---|---|
| *F41G 1/34* | (2006.01) |
| *F21K 2/06* | (2006.01) |
| *G02B 23/14* | (2006.01) |
| *F41G 3/06* | (2006.01) |
| *F41G 1/38* | (2006.01) |
| *F41G 1/44* | (2006.01) |

(52) U.S. Cl.
CPC ............... *F41G 1/345* (2013.01); *F21K 2/06* (2013.01); *F41G 1/38* (2013.01); *F41G 1/44* (2013.01); *F41G 3/06* (2013.01); *G02B 23/14* (2013.01)

(58) Field of Classification Search
CPC ........ F41G 1/35; F41G 11/001–11/008; F41G 1/54–1/545; F41G 1/32–1/36; F41G 1/345; F41G 1/44; F41G 1/38; F41G 3/06; F21K 2/06; G02B 23/14
See application file for complete search history.

(56) References Cited

U.S. PATENT DOCUMENTS

| | | | | |
|---|---|---|---|---|
| 3,784,817 A | * | 1/1974 | James | F41G 1/32 250/467.1 |
| 4,935,632 A | * | 6/1990 | Hart | F21K 99/00 250/462.1 |
| 5,033,219 A | * | 7/1991 | Johnson | F41G 11/003 362/289 |
| 5,400,540 A | * | 3/1995 | Solinsky | F41G 11/001 362/110 |

(Continued)

OTHER PUBLICATIONS

Ade Advanced Optics 1" Scope Ring Adaptor with Picatinny/weaver/universal Rail, Apr. 9, 2013, Amazon.com.*

(Continued)

*Primary Examiner* — Stephen M Johnson
*Assistant Examiner* — Joshua Semick
(74) *Attorney, Agent, or Firm* — Jackson Walker, LLC

(57) ABSTRACT

An illumination system for weapon optics includes a light source and one or more channels that direct light from the light source onto adjustment interfaces of a weapon optical device, such as windage and elevation turrets of a scope. An illumination system for weapon optics may also include an illuminated level device for positioning the weapon level in relation to the surface of the earth. An illumination system for weapon optics illuminates adjustment interfaces of a weapon optical device such that markings on the adjustment interfaces can be read in low-light and no-light conditions.

16 Claims, 5 Drawing Sheets

(56) References Cited

U.S. PATENT DOCUMENTS

| | | | | |
|---|---|---|---|---|
| 5,481,819 A * | 1/1996 | Teetzel | ............... | F41A 9/62 |
| | | | | 42/117 |
| 5,653,034 A * | 8/1997 | Bindon | ............... | G02B 23/105 |
| | | | | 33/297 |
| 5,784,823 A * | 7/1998 | Chen | ............... | F41G 11/001 |
| | | | | 362/110 |
| 6,978,569 B2 | 12/2005 | Williamson, IV et al. | | |
| 7,188,978 B2 * | 3/2007 | Sharrah | ............... | F21S 9/02 |
| | | | | 248/216.4 |
| 7,845,817 B1 * | 12/2010 | Miller | ............... | F41G 1/35 |
| | | | | 362/110 |
| 7,937,879 B2 | 5/2011 | Hamilton | | |
| 7,997,023 B2 * | 8/2011 | Moore | ............... | F41G 1/35 |
| | | | | 42/114 |
| 8,166,697 B1 * | 5/2012 | Sueskind | ............... | F41G 1/38 |
| | | | | 42/119 |
| 8,220,946 B1 * | 7/2012 | Teetzel | ............... | F41C 27/00 |
| | | | | 362/110 |
| 8,484,879 B2 * | 7/2013 | Riley | ............... | F41G 11/004 |
| | | | | 362/110 |
| 8,627,591 B2 * | 1/2014 | Moore | ............... | F41G 1/35 |
| | | | | 42/114 |
| 8,819,985 B1 * | 9/2014 | McCoy | ............... | F41G 1/54 |
| | | | | 33/373 |
| 8,887,975 B1 * | 11/2014 | Basile | ............... | B62J 11/00 |
| | | | | 224/441 |
| 9,303,951 B2 * | 4/2016 | Hancosky | ............... | F41G 1/54 |
| 9,353,936 B2 * | 5/2016 | Jigamian | ............... | F21V 21/406 |
| 2010/0229451 A1 * | 9/2010 | Hamilton | ............... | F41G 1/345 |
| | | | | 42/126 |
| 2015/0198755 A1 * | 7/2015 | Roenker | ............... | G02B 23/14 |
| | | | | 362/552 |
| 2016/0054556 A1 * | 2/2016 | Christiansen | ............... | F41G 1/35 |
| | | | | 359/894 |

OTHER PUBLICATIONS

US Navy 100712-N-7948R-184 Marines practice firing thier weapon aboard USS Pearl Harbor, https://commons.wikimedia.org/, Jul. 15, 2010.*

* cited by examiner

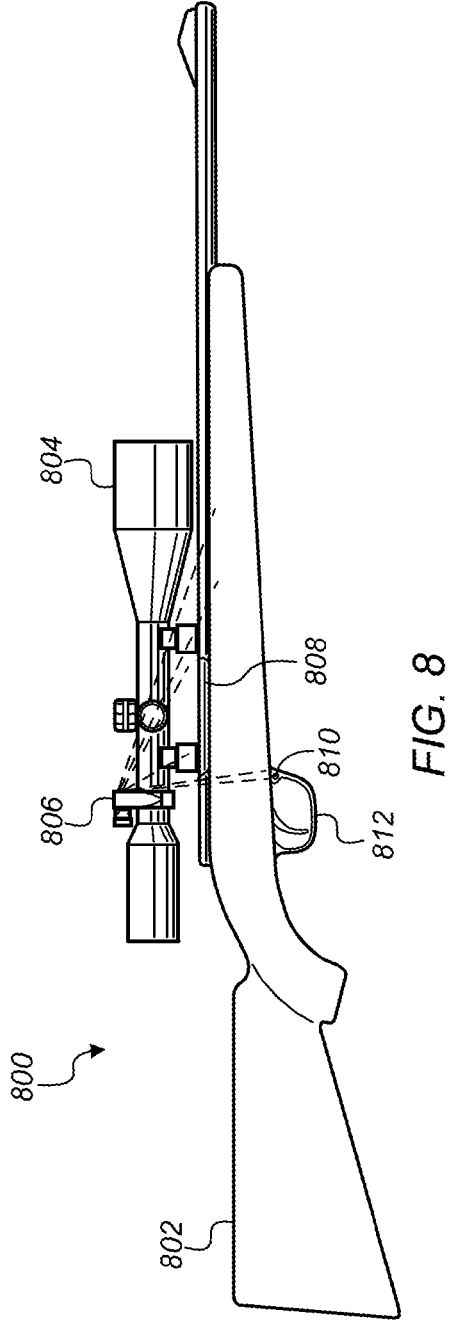
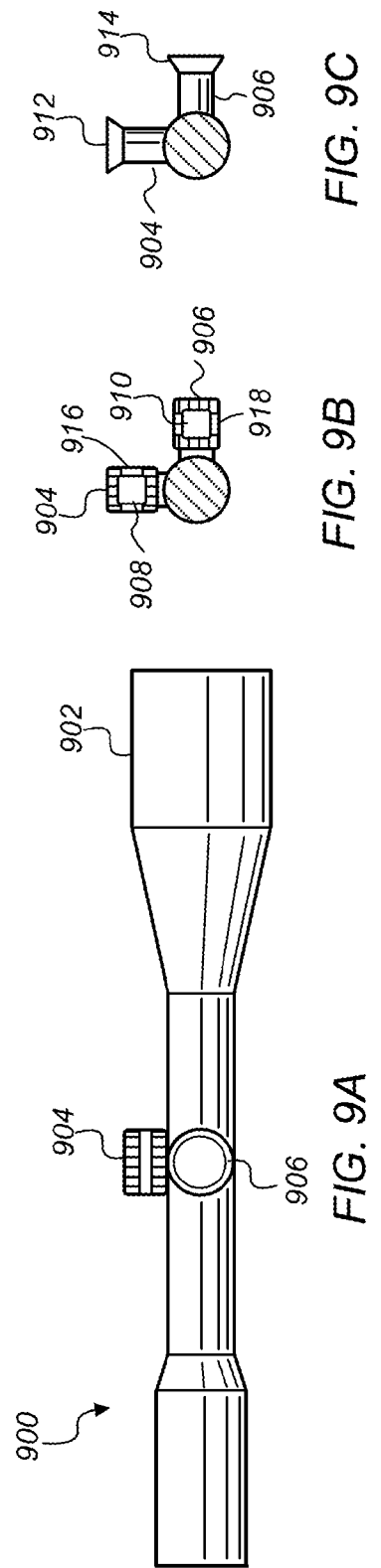

ILLUMINATION SYSTEM FOR WEAPON OPTICS

This application claims benefit of priority of U.S. Provisional Application Ser. No. 62/029,565 entitled "TURRET AND LEVEL ILLUMINATING SYSTEM FOR RIFLE SCOPE" filed Jul. 28, 2014, the content of which is incorporated by reference herein in its entirety.

BACKGROUND

Weapons, such as firearms, hunting bows, and other types of weapons, are commonly equipped with sighting apparatuses, such as aiming scopes. Typical scopes include adjustments for elevation and windage. When a projectile is released from a weapon, forces may act on the projectile that alter the path of the projectile as the projectile travels away from the weapon. For example, as a projectile travels away from a weapon from which it is released the force of gravity will cause the projectile to lose elevation. Also, as a projectile travels away from a weapon from which it is released, other forces, such as a cross wind, may cause the projectile to deviate from a straight path and instead veer in a horizontal direction. Elevation and windage adjustments of a typical scope allow a user to account for the effects of these forces on a projectile. For example, a scope may be adjusted to account for an anticipated loss of elevation, so that an object that is a certain distance from the weapon appears to be in the center of the crosshairs of the scope, even though a straight line from the weapon to the object is actually slightly above the object. In this way, a projectile released from the weapon will impact the object as seen in the crosshairs of the scope even though gravity has caused the projectile to lose elevation as the projectile travels away from the weapon.

Weapon sighting apparatuses, such as aiming scopes, may need to be adjusted during the course of using a weapon. For example, a weapon may be aimed at targets that are at varying distances from the weapon. In order to account for the different distances, an elevation adjustment of a scope attached to the weapon may need to be adjusted between uses of the weapon. In another example, changing wind conditions may necessitate adjusting a windage adjustment of a scope between uses of a weapon. Other reasons may necessitate adjusting a windage or elevation adjustment of a scope between uses of a weapon.

Weapon sighting apparatuses, such as aiming scopes that include elevation and windage adjustments may include markings, such as minute of angle markings (MOA), that indicate degrees of adjustment of the elevation and windage. In low-light conditions, it may be difficult for a user of a weapon to read such markings of elevation and windage adjustments on an attached scope.

In addition, weapon sighting apparatuses, such as aiming scopes, are typically mounted on a weapon such that elevation adjustments are in a vertical plane and windage adjustments are in a horizontal plane perpendicular to the vertical plane of the elevation adjustments. In order for the elevation adjustments and windage adjustments of a scope to have the desired affect that accounts for anticipated forces acting on the projectile in the horizontal plane and the vertical plane as the projectile leaves the weapon, it is desirable to aim and fire the weapon such that the weapon and scope are aligned with the horizontal and vertical planes. In other words, it is desirable that the weapon and scope be held level when the weapon is aimed and fired. In low-light conditions it may be difficult to determine if a weapon is being held level when being aimed and fired.

BRIEF DESCRIPTION OF THE DRAWINGS

FIG. 8 illustrates an illumination system for weapon optics mounted on a scope of a rifle, according to some embodiments.

FIG. 9A illustrates an illumination system for weapon optics integrated into a scope, according to some embodiments.

FIG. 9B illustrates an illumination system for weapon optics integrated into a scope, according to some embodiments.

FIG. 9C illustrates an illumination system for weapon optics integrated into a scope, according to some embodiments.

Figure 1:
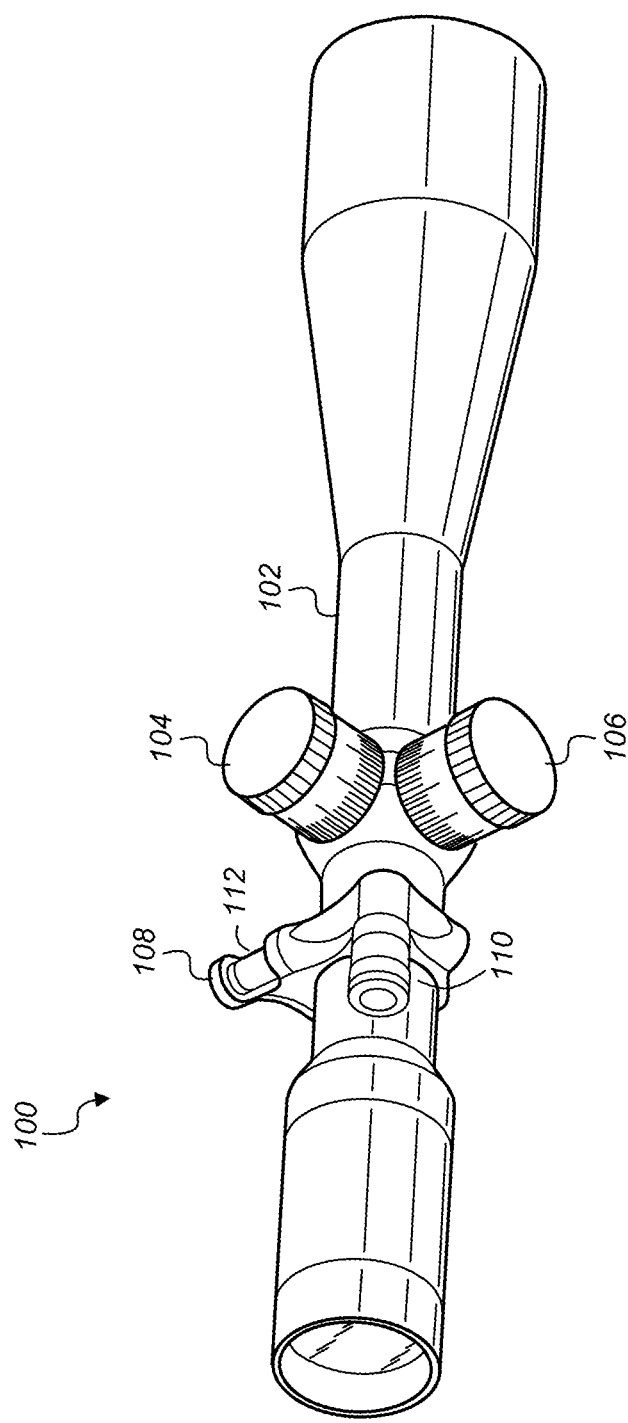
FIG. 1 illustrates an illumination system for weapon optics mounted on a scope, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of an illumination system for weapon optics are disclosed. According to some embodiments an illumination system for weapon optics includes an illumination device that includes a clamp configured to mount on a scoped weapon or configured to mount on a scope of a scoped weapon. For example, a clamp of an illumination device may be configured to mount on a rail of a rifle. In another example, a clamp of an illumination device mounts on a scope attached to a hunting bow or rifle. An illumination device may be used with other types of weapons such as crossbows, pistols shotguns, etc. The clamp includes a light source, and one or more channels configured to direct light from the light source onto one or more of: an elevation turret of the scope of the scoped weapon, or a windage adjustment turret of the scope of the scoped weapon. The one or more channels are configured to direct light such that adjustment markings (for example, minute of angle markings MOA) of the windage adjustment turret or adjustment markings of the elevation adjustment turret can be read in a low-light environment.

According to some embodiments, an apparatus includes one or more mounting portions configured to mount on a scoped weapon or to mount on an attachment coupled to the scoped weapon. The one or more mounting portions include a light source and one or more channels configured to direct light form the light source onto one or more adjustment interfaces of the scoped weapon or one or more adjustment interfaces of the attachment coupled to the scoped weapon.

According to some embodiments, an apparatus includes a scope configured to mount on a weapon to assist in aiming in the weapon, wherein the scope includes one or more adjustment interfaces, a light source, and one or more channels configured to direct light from the light source onto at least one of the one or more adjustment interfaces.

When operating a weapon in low-light or no-light conditions, for example at night, in dark buildings, dark shooting locations, etc., a user of a weapon may not be able to read markings on windage and elevation turret adjustment knobs of a scope. Also, in low-light or no-light conditions a user of a weapon may not be able to read a level attached to the weapon indicating position of the weapon (e.g that indicates whether the weapon is being held level). In order to be able to view the adjustment markings for windage and elevation of a scope attached to a weapon, a user of the weapon may use an illumination system for weapon optics to be able to read the windage and elevation adjustment markings. In some embodiments, an illumination system for weapon optics may include an illuminated level device.

Some examples of uses for a weapon in low-light or no-light conditions include predator hunters that operate rifle systems at night, tactical shooters including military and police operations, and various other uses.

FIG. 1 illustrates an illumination system for weapon optics mounted on a scope, according to some embodiments. An illumination system for weapon optics may include a clamp (housing system) that includes a light source and an illuminated level. The clamp (housing system) may mount on a scope, such as a scope that mounts on a rifle, bow, or other weapon. For example, illumination system for weapon optics 100, includes clamp 108. Clamp 108 is mounted on scope 102. Clamp 108 includes illuminated level device 112 and light source 110. A scope on which an illumination system for weapons optics is mounted may include elevation adjustment interfaces and windage adjustment interfaces. For example, scope 102 includes windage adjustment turret 104 and elevation adjustment turret 106. The windage and elevation adjustment turrets of a scope may allow a user of a weapon on which the scope is mounted to adjust the scope to account for forces that may alter a path of a projectile released from the weapon. Such adjustments may account for a distance to a target or a cross-wind. An illumination system for weapon optics, such as system 100, may include one or more channels in a clamp, such as clamp 108, that direct light from a light source, such as light source 110, onto one or more adjustment interfaces of a scoped weapon or an attachment attached to a scoped weapon, such as windage adjustment turret 104 and elevation adjustment turret 106. A user of a scoped weapon that includes an illumination system for weapon optics may be able to easily read the markings on adjustment interfaces of a scoped weapon or adjustment interfaces of an attachment to a scoped weapon in low-light or no-light conditions. For example, a hunter may be hunting in low-light conditions. Upon identifying a target, the hunter may determine a distance to the target. The hunter may use an illumination system for weapon optics to quickly and accurately adjust a scope of a weapon used by the hunter to account for the distance to the target. An illumination system for weapon optics mounted on a weapon may allow the hunter to quickly and subtly make adjustments to the weapon scope without frightening the target animal.

A clamp of an illumination system for weapon optics, such as clamp 108, may be mounted on a scope, such as scope 102, in a variety of positions both forward and backward along the scope. This may allow a user of the weapon to adjust how light is directed onto the adjustment interfaces of a scope, such as windage adjustment 104 and elevation adjustment 106. Also, a clamp of an illumination system for weapon optics may be mounted permanently to a scope, such as scope 102, or may be mounted temporarily to a scope, such as scope 102. For example, a hunter may temporarily mount an illumination system for weapon optics, such as system 100, for a particular nighttime use, or may permanently mount an illumination system for weapon optics, such as system 100, and leave the system mounted on a rifle scope in both daytime and nighttime uses.

In some embodiments, a light source of an illumination system for weapon optics, such as light source 110 of system 100, is powered by a device storing electrical energy, such as a battery. In some embodiments, a light source of an illumination system for weapon optics emits light due to a chemical reaction. For example, a light source of an illumination system for weapon optics, such as light source 110 of system 100, may include a snap glow-stick that emits light when two chemicals in the snap glow-stick react with each other. In some embodiments, a light source of an illumination system for weapon optics, such as light source 110 of system 100, emits light due a radioactive material. For example, a light source of an illumination system for weapon optics, such as light source 110 of system 100 may include a radioactive material such as tritium, a radioactive isotope of hydrogen that emits light. In some embodiments other types of light sources may be used in an illumination system for weapon optics. In some embodiments a light source of an illumination system for weapon optics, such as light source 110 of system 100 is interchangeable such that different types of light sources (e.g. battery powered, snap glow-stick, or tritium) can be interchanged in an illumination system for weapon optics. In some embodiments, a light source, such as an electrically powered light source, a chemical based light source, or a radiation based light source can emit light for extended periods of time without needing to be recharged. For example a light source may not need to be exposed to sunlight in order to emit light.

In some embodiments, a light source of an illumination system for weapon optics, such as light source 110 of system 100, emits colored light. For example, a light source may emit purple light, red light, green light, yellow light, amber light or light of some other color. Depending on the use of the scoped weapon that includes the illumination system for weapon optics, different colors may be desirable. For example, some hunters may prefer a particular color over another color. Also, depending on the type of hunting, some animals may not be startled by particular colors where they would be startled by other colors. Therefore, depending on the type of animal being hunted, a particular color of light to be used in a light source for an illumination system for weapon optics may be desired. For example, predator hunters may prefer red light or amber light.

In some embodiments, an illumination system for weapon optics includes a passage that reflects light from a light source, such as light source 110, to a level device, such as level device 108. In some embodiments, a light source, such as light source 110 includes a push bottom on/off position switch that controls whether light is emitted from light source 110.

A level device of an illumination system for weapon optics, such as level device 108, may allow a user to level a horizontal axis of the weapon in low-light conditions and in lighted conditions.

Figure 2:
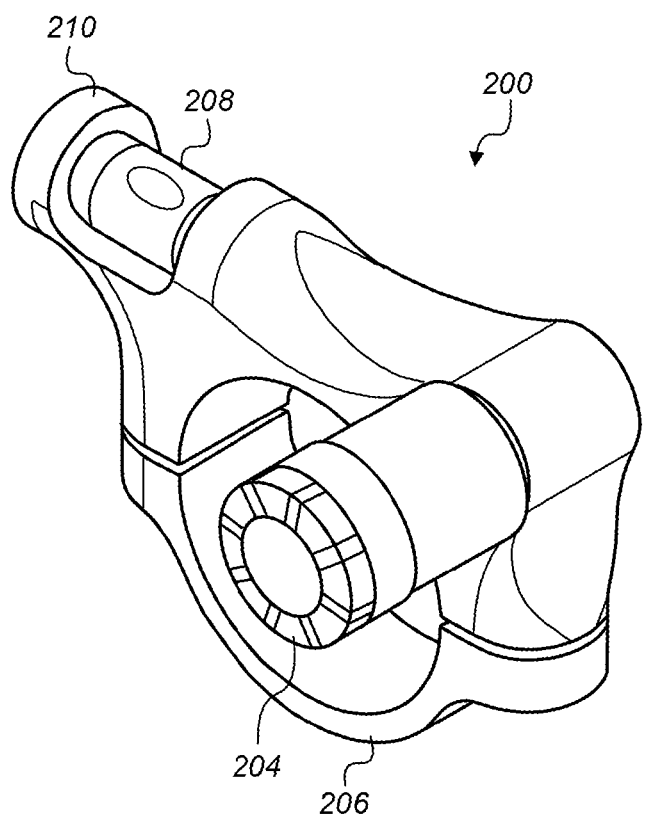
FIG. 2 illustrates a perspective view of an illumination system for weapon optics, according to some embodiments.

FIG. 2 illustrates a perspective view of an illumination system for weapon optics, according to some embodiments. System 100 described in regards to FIG. 1 may be a system 200 as illustrated in FIG. 2. System 200 in FIG. 2 includes light source 204, clamp upper body 210, clamp lower body 206 and level device 208. Upper clamp body 210 and lower clamp body 206 may clamp onto a scope of a scoped weapon, such as scope 102 described in FIG. 1.

In some embodiments, an illumination system for weapon optics may be combined with a scope mounting system to mount a scope to a weapon. For example, lower clamp body 206 may be mounted to a weapon directly. Upper clamp body 210 and lower clamp body 206 may be used to mount a scope to a weapon and also be used as an illumination system for weapon optics.

Figure 3:
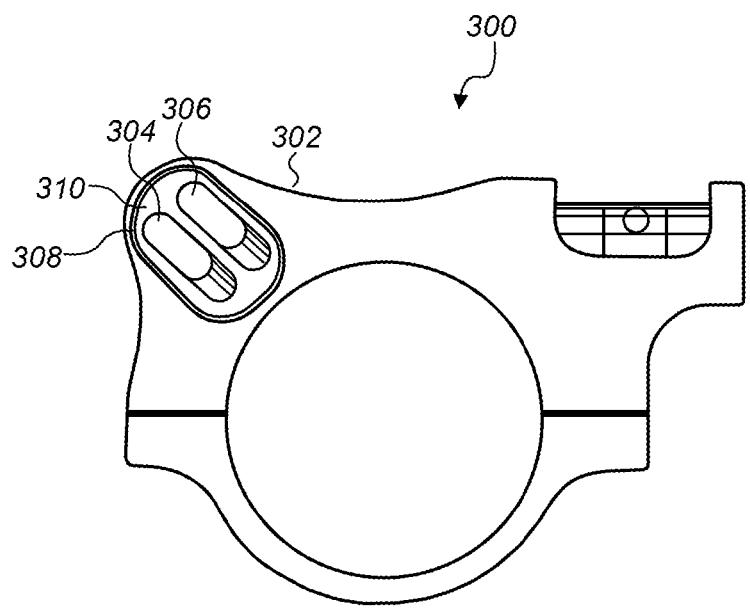
FIG. 3 illustrates a planar view of a side of an illumination system for weapon optics, according to some embodiments.

FIG. 3 illustrates a planar view of a side of an illumination system for weapon optics, according to some embodiments. System 300 illustrated in FIG. 3 may be the same as system 100 or system 200 illustrated in FIGS. 1 and 2. System 300 is shown from the opposite side as system 200 shown in FIG. 2.

An upper clamp body of an illumination system for weapon optics, such as upper clamp body 302 of system 300, may include one or more channels that direct light from a light source, such as light source 204, onto elevation adjustment interfaces or windage adjustment interfaces of a scope, such as windage adjustment 104 of scope 102 and elevation adjustment 106 of scope 102, both illustrated in FIG. 1. Light from a light source, such as light source 204, may pass through an internal passageway (not shown) to illuminate a level device, such as level device 208.

A surface of an upper clamp body of an illumination system for weapon optics, such as upper clamp body 302, may include a machined recessed portion. For example, upper clamp body 302 includes recessed portion 310. An interface between an upper clamp body and a recessed portion may include a transition, such as a bevel. For example, bevel 308 transitions between a surface of upper clamp body 302 and recessed portion 310. A recessed portion of a clamp body that includes channels that direct light may focus light onto a desired location, such as onto a windage or elevation adjustment interface. As light leaves a channel, such as channels 304 and 306, the walls of an interface, such as bevel 308, may act as a reflector to focus the angle of the light leaving the channels such that the light is focused towards the desired location. Also, a channel for directing light, such as channel 304 or 306, may be shaped such that the channel gradually opens in the direction in which light is desired to be directed. In some embodiments, a channel may be machined with an end-mill sweep. For example, the cross-sectional area of channels 304 and 306 gradually increases in a downward direction as light travels through channels 304 and 306 towards the surface of recessed portion 310. By increasing the cross-sectional area in a downward direction, light passing through the channel at an angle that is less than the gradual slope of the channel is allowed to pass through the channel without being deflected by a wall of the channel. In this way the shape of a channel of an illumination system for weapon optics may be used to direct the light to a desired location.

In some embodiments, an illumination system for weapon optics is machined and anodized. In some embodiments, other surface finishes may be used.

Figure 4:
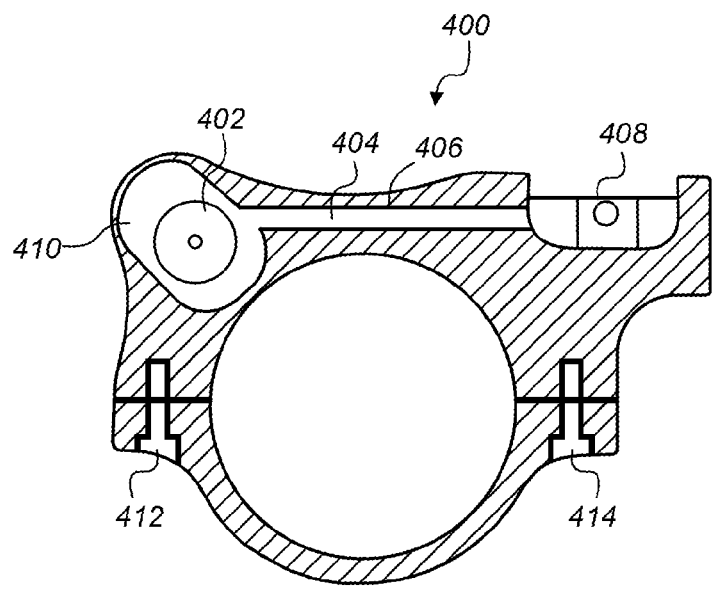
FIG. 4 illustrates a cross-sectional view of an illumination system for weapon optics, according to some embodiments.

FIG. 4 illustrates a cross-sectional view of an illumination system for weapon optics, according to some embodiments. System 400 illustrated in FIG. 4 may be any of systems 100, 200, and 300 described in FIGS. 1-3. System 400 includes light source 402 coupled to channel 410. Passageway 404 connects channel 410 to level device 408. In some embodiments, a passageway or channel connecting a light source to a level device, such as passageway 404, may be polished. A polished passageway may direct light to a level device more efficiently than a non-polished passageway. A metallic surface of a polished passageway may reflect light better than a painted or anodized surface. In some embodiments an illumination system for weapon optics, such as system 400, may be anodized and subsequent to being anodized a passageway, such as passageway 404, may be polished such that the anodized layer is removed from the passageway and such that the passageway has a polished surface, for example passageway 404 has polished surface 406. In some embodiments, in order to polish the passageway, such as passageway 404, it may be reamed after being anodized.

An illumination system for weapon optics, such as system 400, may include countered bored holes that accept a fastener that fastens the illumination system for weapon optics to a weapon or an attachment of a weapon. For example, system 400 includes counter bored holes 412 and 414. In some embodiments, other types of holes and fasteners may be used.

Figure 5:
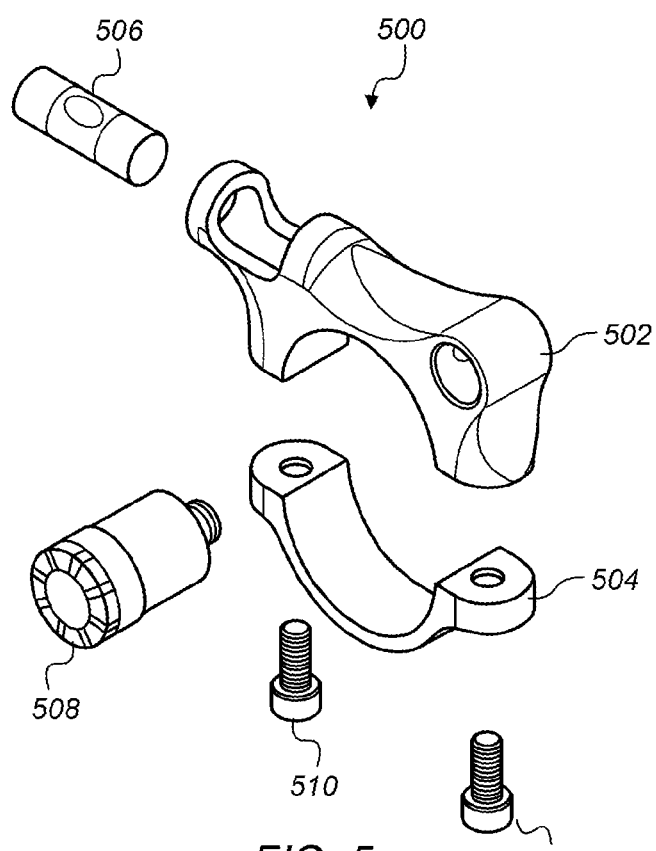
FIG. 5 illustrates an exploded view of an illumination system for weapon optics, according to some embodiments.

FIG. 5 illustrates an exploded view of an illumination system for weapon optics, according to some embodiments. System 500 illustrated in FIG. 5 may be any of systems 100, 200, 300, and 400 illustrated in FIGS. 1-4. System 500 includes upper clamp body 502, lower clamp body 504, level device 506, light source 508, and fasteners 510 and 512. An illumination system for weapon optics, may be mounted on a scope of a scoped weapon by fastening an upper clamp body and a lower clamp body to the scope of the scoped weapon. For example, upper body clamp 502 may be positioned on a top portion of a scope, lower clamp body 504 may be positioned on a lower portion of a scope and aligned with upper clamp body 502. The location of an illumination system for weapon optics may be adjusted forward and backward on a scope. Once the illumination system for weapon optics is in a desired location along the scope, the illumination system for weapon optics may be secured by tightening fasteners, such as fasteners 510 and 512 through a lower clamp body, such as lower clamp body 504 and into an upper clamp body, such as upper clamp body 502.

A light source of an illumination system for weapon optics, such as light source 508, may thread into an upper clamp body, such as upper clamp body 502. In some embodiments a light source may thread into a different component of an illumination system for weapon optics, such as in a rail mounted illumination system for weapon optics depicted in FIG. 7. Different light sources may be used in an illumination system for weapon optics. For example, a battery powered light source may be used. Also, a light source that emits light due to a chemical reaction may be used, or a light source that emits light from a radioactive material may be used. In some embodiments other types of light sources may be used. An illumination system for weapon optics may interchangeably accept different types of light sources. For example, a battery powered light source 508 may be threaded into upper clamp portion 502. Depending on circumstances, it may be more desirable to use a light source that emits light due to a chemical reaction, such as a glow stick. The battery powered light source 508 may be unthreaded from upper clamp portion 502 and a glow-stick type light source 508 may be threaded into upper clamp portion 502. While, system 500 is described as a clamp style illumination system for weapon optics, interchangeable light source types may be used in other types of illumination systems for weapon optics, such as a rail mount system as described in FIG. 7 or a scope integrated system as described in FIG. 9.

Figure 6:
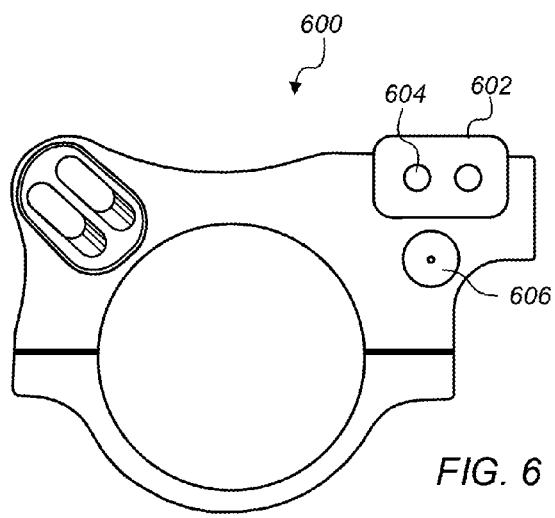
FIG. 6 illustrates a planar view of a side of an illumination system for weapon optics, according to some embodiments.

FIG. 6 illustrates a planar view of a side of an illumination system for weapon optics, according to some embodiments. An illumination system for weapon optics may include additional components along with or in place of a level device. For example, an illumination system for weapon optics may include a range finder or a laser pointer. In FIG. 6, system 600 includes range finder 602 and laser 606. A range finder, such as range finder 602, may include optics, such as optics 604. A range finder may be configured to use optics, such as optics 604 to determine a distance to a target. In some embodiments, a ranger finder may include a readout that displays the distance to a target. A laser pointer, such as laser 606, may indicate a direction in which the weapon is aimed. A user of a weapon may be able to determine a probable point of impact of a projectile released from the weapon based on where a laser pointer is pointing, such as laser 606.

Figure 7A:
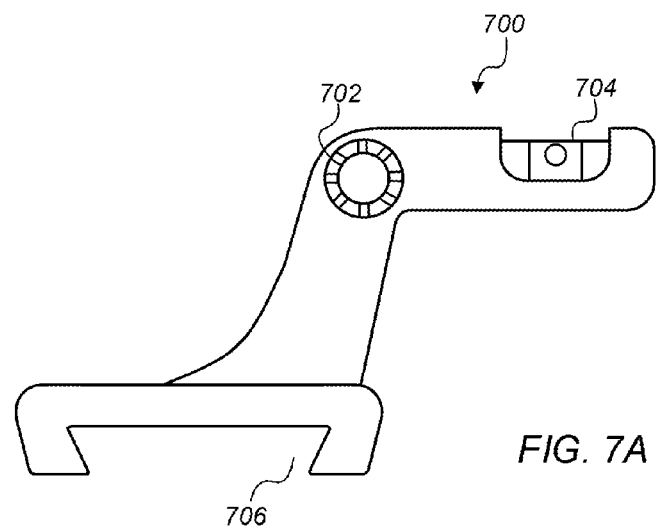
FIG. 7A illustrates a planar view of a side of an illumination system for weapon optics, according to some embodiments.

FIG. 7A illustrates a planar view of a side of an illumination system for weapon optics, according to some embodiments. An illumination system for weapon optics may mount on a rail of a weapon. For example, system 700 includes rail mount 706. A rail-mounted illumination system for weapon optics may function in a similar manner as a clamp-mounted illumination system for weapon optics, such as systems 100, 200, 300, 400, 500, and 600 described in FIGS. 1-6. System 700 illustrates a rail-mounted illumination system for weapon optics with a level device 704 on a right side of system 700. In some embodiments, an illumination system for weapon optics may be configured such that a level device is on a left side of the illumination system for weapon optics. For example, light source 702 and level device 704 may be on a left side of system 700.

A rail-mounted illumination system for weapon optics may mount on a weapon such that the contour of the illumination system for weapon optics matches a contour of a weapon optical device that is to be illuminated, such as a scope. For example, system 700 has a contour that matches a contour of a scope, such that light source 702 is positioned next to the scope when system 700 is mounted on a rail. A rail-mounted illumination system for weapon optics may allow a user of a weapon to quickly install and remove an illumination system for weapon optics.

Figure 7B:
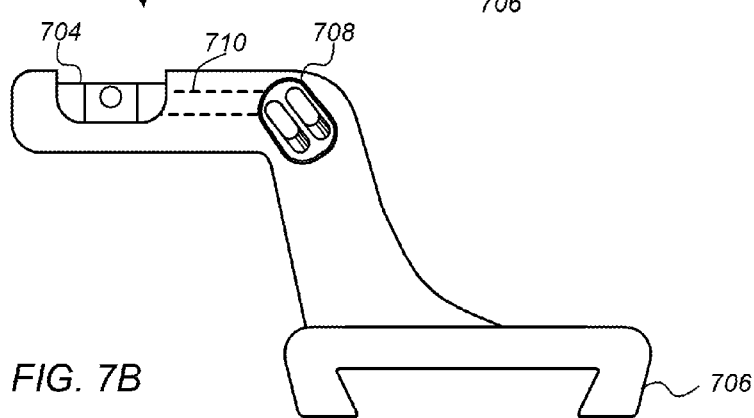
FIG. 7B illustrates a planar view of a side of an illumination system for weapon optics, according to some embodiments.

FIG. 7B illustrates a planar view of a side of an illumination system for weapon optics, according to some embodiments. A rail-mounted illumination system for weapon optics may include one or more channels that direct light onto an adjustment interface of a scope. For example, system 700 includes channels 708. Channels 708 may be the same as channels 304 and 306 described in FIG. 3. A rail-mounted illumination system for weapon optics may include a polished passageway that directs light from a light source to a level device. For example, system 700 includes passageway 710 that directs light from light source 702 to level device 704. Passageway 710 may be similar to passageway 404 described in FIG. 4.

FIG. 8 illustrates an illumination system for weapon optics mounted on a scope of a rifle, according to some embodiments. An illumination system for weapon optics may illuminate components of a weapon on which the illumination system is mounted or areas adjacent to the weapon. For example, an illumination system for weapon optics may illuminate a safety mechanism of a rifle, a chamber of a rifle, or an area adjacent to a weapon on which it is mounted. System 800 includes rifle 802 with scope 804 mounted on rifle 802. Illumination system for weapon optics 806 is mounted on scope 804. Illumination system 806 illuminates safety mechanism 810 on trigger 812 and illuminates rifle chamber 808. In addition illumination system for weapon optics 806 may illuminate adjustment interfaces of scope 804.

FIG. 9A illustrates an illumination system for weapon optics integrated into a scope, according to some embodiments. In some embodiments, a light source of an illumination system for weapon optics may be integrated into the weapon optics itself. For example, an adjustment interface of a scope may include a light source within the adjustment interface that shines light through channels in the adjustment interface to light markings on an exterior of the adjustment interface. Also, in some embodiments with a light source integrated into the weapon optics, a light source may be affixed to an adjustment interface such that it shines light down on the adjustment interface.

System 900 includes scope 902, adjustment interface 904 and adjustment interface 906. As shown in FIG. 9B, in some embodiments, a light source, such as light sources 908 and 910, may be located within an adjustment interface, such as adjustment interfaces 904 and 906. One or more channels, such as channels 916 and 918, may allow light from a light source located within an adjustment interface to shine through the adjustment interface to light markings on an exterior of the adjustment interface. In some embodiments, the channels may be the markings themselves. For example, the channels 916 and 918 may have the shape of numbers that indicate minute of angle adjustments of adjustment interfaces 904 and 906. In some embodiments, light sources within adjustment interfaces may be interchange. For example light sources within adjustment interfaces may be interchanged between a battery-powered light source, a glow-stick, or tritium light source.

As shown in FIG. 9C, in some embodiments, a light source, such as light sources 912 and 916, may be mounted on adjustment interfaces, such as adjustment interfaces 904 and 906, such that the light sources shine light down on markings on the adjustment interfaces. In such an arrangement, the light sources may thread into an end of the adjustment interfaces and may be interchangeable.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An illumination device comprising:
a clamp configured to mount on a scoped weapon or to mount on a scope of the scoped weapon, wherein the clamp comprises:
a light source; and
one or more channels that terminate at one or more apertures on a surface of the clamp and configured to direct light from the light source by projection through the one or more apertures onto one or more of: an elevation adjustment turret of the scope of the scoped weapon, or a windage adjustment turret of the scope of the scoped weapon, the light source being configured to emanate from a position different than the elevation adjustment turret and the windage adjustment turret,
wherein the one or more channels are configured to direct light such that adjustment markings of the windage adjustment turret or adjustment markings of the elevation adjustment turret can be read in a no-light environment.

2. The illumination device of claim 1 further comprising:
a level device configured to indicate a level of the scoped weapon relative to a surface of the earth; and
an additional channel configured to direct light from the light source to the level device, such that the level device can be read in a no-light environment.

3. The illumination device of claim 1, wherein the light source is powered by a device storing electrical energy.

4. The scope adjustment illumination device of claim 1, wherein the light source emits light due to a chemical reaction.

5. The scope adjustment illumination device of claim 1, where the light source emits light due to a radioactive material.

6. An apparatus comprising:
one or more mounting portions configured to mount on a scoped weapon or to mount on an attachment coupled to the scoped weapon, wherein at least one of the one or more mounting portions comprises:
a light source; and
one or more channels that terminate at one or more apertures on a surface of the at least one of the one or more mounting portions and configured to direct light from the light source by projection through the one or more apertures onto one or more adjustment interfaces of the scoped weapon or one or more adjustment interfaces of the attachment coupled to the scoped weapon, the light source being configured to emanate from a position different than the one or more adjustment interfaces of the scoped weapon or the one or more adjustment interfaces of the attachment coupled to the scoped weapon.

7. The apparatus of claim 6, further comprising a level device configured to indicate a level of the scoped weapon relative to a surface of the earth,
wherein at least one of the one or more channels are configured to direct light from the light source onto the level device such that the level device can be read in a no-light environment.

8. The apparatus of claim 7, wherein the at least one channel is polished.

9. The apparatus of claim 6, wherein the one or more adjustment interfaces comprises one or more of a windage adjustment turret or an elevation adjustment turret,
wherein the one or more channels are configured to direct light from the light source onto the windage adjustment turret or the elevation adjustment turret such that adjustment markings of the windage adjustment turret or adjustment markings of the elevation adjustment turret can be read in a no-light environment.

10. The apparatus of claim 6, wherein the light source comprises one or more of:
an electrical power source, one or more chemicals that emit light when mixed, or a radioactive material that emits light.

11. The apparatus of claim 6, wherein the mounting portion is configured to interchangeably accept a plurality of different types of light sources.

12. The apparatus of claim 6, wherein the light source is configured to emit purple light, red light, green light, or yellow light.

13. The apparatus of claim 6, further comprising a range finder, wherein the range finder is configured to determine a distance from the scoped weapon to a target.

14. The apparatus of claim 6, further comprising a laser, wherein the laser is configured to indicate a direction in which the scoped weapon is aimed.

15. The apparatus of claim 6, wherein the one or more mounting portions are configured to mount on a rail of the scoped weapon.

16. The apparatus of claim 6, wherein the one or more channels are configured to: direct light onto a safety device of the scoped weapon, direct light onto a chamber portion of the scoped weapon, or direct light onto an area adjacent to the scoped weapon.

* * * * *